March 17, 1953 F. M. STEPHENS 2,631,614
GAS STREAM PULSATION DAMPENER
Filed Feb. 5, 1949
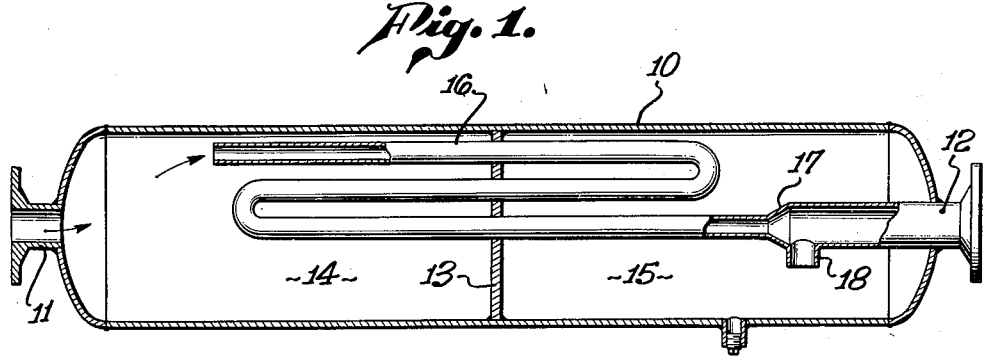
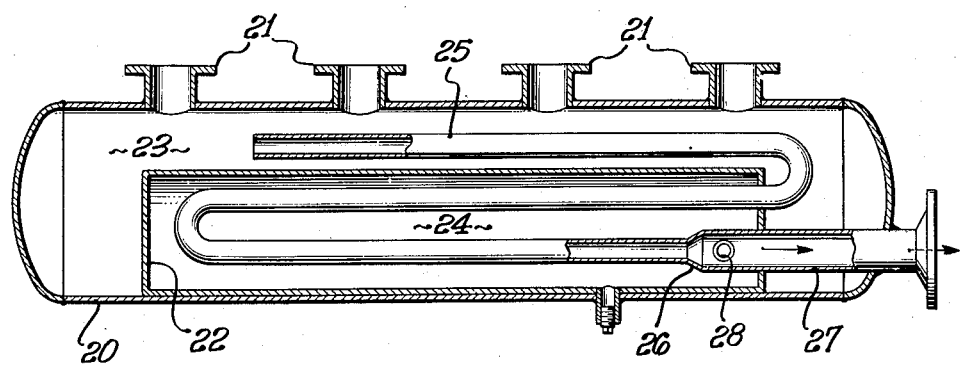
Foster M. Stephens,
INVENTOR.
BY Halvin White
ATTORNEY.

Patented Mar. 17, 1953

2,631,614

UNITED STATES PATENT OFFICE 2,631,614

GAS STREAM PULSATION DAMPENER

Foster M. Stephens, Monterey Park, Calif., assignor to The Fluor Corporation, Ltd., Los Angeles, Calif., a corporation of California Application February 5, 1949, Serial No. 74,841

7 Claims. (Cl. 138—26)

This invention has to do with improvements in dampeners for eliminating pulsations in gas streams, as for example at the suction or discharge side of a piston type compressor whose operation creates pressure waves or pulsations in the communicating gas stream.

In certain of its aspects the invention relates to the general types of pulsation dampeners disclosed in my Patent No. 2,437,446, issued March 9, 1948, and also the manifold design disclosed in my copending application Serial Number 643,510, filed January 26, 1946, now Patent No. 2,501,794. Specifically, those dampener structures embody a shell containing a pair of chambers having respective gas inlet and outlet openings, and interconnected by an elongated flow restricting pipe opening into the chambers so that the gas has series flow through both chambers.

The present invention contemplates a generally similar relationship between the chambers and interconnecting flow restricting pipe, except that provision is made for utilizing one of the chambers as a closed acoustical capacitance, i. e. closed in the sense that the chamber is closed except for a surge passage communication with the gas stream flowing otherwise directly between the inlet or outlet (ordinarily the inlet) and the other chamber which has a series flow relation to the restricted passage pipe.

The manner in which this type of combined series and parallel chamber relation with the gas stream flow through the dampener, is adapted to either of the types of dampeners referred to above, will be understood to best advantage from the following detailed description of certain illustrative embodiments shown by the accompanying drawings, in which:

Fig. 1 is a sectional view illustrating one form of the invention adapted for installation in a gas line; and Fig. 2 is a similar view illustrating a variational form as embodied in a manifold type dampener.

The form of pulsation dampener illustrated in Fig. 1 comprises an elongated shell 10, having at one end a gas inlet connection 11, and at its opposite end a tubular outlet 12. The shell is suitably divided, as by the transverse partition 13, into two acoustical capacitance chambers 14 and 15, preferably of substantially equal volume. The gas entering chamber 14 close to the outlet connection 12 by way of an elongated inductance passage pipe 16 ordinarily of substantially smaller internal diameter than the inlet 11 and outlet 12. As the dampener is designed for eliminating pulsations created in the gas stream in the operating frequency of the usual gas compressor, the length of pipe 16 is considerably in excess of the total length of the shell 10, the required length of the pipe being accommodated in the shell as by reverse runs of the pipe extending through the partition 13, substantially as illustrated.

The outlet end of pipe 16 is attached to the larger diameter pipe 12 as by an enlarging connection or fitting 17. Whereas the gas flow from the inlet 11 discharges directly into chamber 14 and the latter therefore is in essentially series relation with the inlet and pipe 16, chamber 15 is closed except for a surge communication with the gas stream flowing through pipe 12, therefore the chamber may be regarded as having a parallel type connection or communication with the gas conducting pipe. Such communication typically may occur through a lateral opening or nipple 18 in the pipe 12, the opening serving essentially as a surge passage by way of which increasing or decreasing, pulsation created pressures of the gas stream flow through the pipe, are transmitted to the closed chamber 15.

As in my issued patent and copending application referred to above, the chambers 14 and 15 function as acoustical capacitances, with the elongated pipe 16 confining the gas in an extended and restricted stream, the length and diameter of the pipe being such as to cause the body or column of gas therein to have such inertia or impedance characteristics as ultimately to effect, in cooperation with the chambers 14 and 15 a phase shifting and canceling out of the gas pulsations. While the gas may be passed through the dampener in either direction, ordinarily it is desirable to introduce the gas openly into chamber 14 for the purpose of minimizing any tendency for pressure or sonic wave reflections upstream from the dampener.

The second form of the invention shown in Fig. 2 is adapted for use as a manifold type dampener to be connected with a series of compressor gas discharge or intake ports. Accordingly, here the outer shell 20 is shown typically as having a plurality of gas inlets 21 which may correspond in number and spacing to the connections to be made with the compressor or compressors. Shell 20 contains an inner shell 22, the two shells desirably being so proportioned that chamber 23 defined by the space between the shells, corresponds substantially in volume to chamber 24 within the inner shell. In both forms of the invention, the two chambers in each instance need not necessarily have the same volumes, so long as each chamber has at least the required minimum volume, but ordinarily for purposes of economy in construction and minimizing the overall size of the dampener, it is preferred that the two chambers in an individual dampener shall have substantially the same volume.

The pulsating gas streams entering chamber 23 through the inlets 21, flow in a restricted stream through the inductance pipe 25 which, as before, ordinarily is substantially longer than the length of shell 20 and is accommodated therein by the reverse bend or equivalent form of the pipe. The discharge end of the pipe connects at 26 with the enlarged diameter outlet pipe 27 extending out through the ends of the shells. Pressure variations or pulsations of the gas stream flowing through the dampener, are transmitted to the closed chamber 24 through the lateral surge opening 28 in pipe 27. As will be understood, the functional relation of chamber 23, its series relation and communication with pipe 25, and the parallel connection and communication between the pipe conducted gas stream and chamber 24, are essentially the same as described with reference to Fig. 1.

Since the present invention is concerned primarily with dual series-parallel relation in the communications between the capacitance chambers and the gas stream flowing through the dampener, it appears unnecessary to go into detail concerning the dimensional relationship of the parts. For such information reference may be had to my issued patent and copending application identified above, which gives the design information for determining the sizes of the capacitance chambers and intercommunicating inductance pipe for the elimination of pulsations in a gas stream having certain predetermined properties and characteristics.

I claim:

1. Apparatus for dampening pulsations in a gas stream, comprising a shell containing a pair of chambers and gas inlet and outlet openings communicating respectively with said chambers, a conduit having an end connected to said shell at the location of and in communication with one of said openings, said conduit including a restricted pipe of greater length than the shell and having an open end terminating in one of said chambers, there being an open surge passage connecting said conduit with the other chamber and the latter chamber being closed except for its surge passage communication with said conduit, and said conduit being imperforate between its said open end and said surge passage.

2. Apparatus for dampening pulsations in a gas stream, comprising a shell containing a pair of chambers and gas inlet and outlet openings communicating respectively with said chambers, a conduit having an end connected to said shell at the location of and in communication with one of said openings, said conduit including a restricted pipe of greater length than the shell contained entirely within the shell and having an open end terminating in one of said chambers, there being an open surge passage connecting said conduit with the other chamber and the latter chamber being closed except for its surge passage communication with said conduit, and said conduit being imperforate between its said open end and said surge passage.

3. Apparatus for dampening pulsations in a gas stream, comprising a shell containing a pair of chambers and gas inlet and outlet openings communicating respectively with said chambers, a conduit including an enlarged diameter portion extending within the shell directly from one of said openings and a reduced diameter continuing pipe of greater length than the shell and having an open end terminating in one of said chambers, there being an open surge passage connecting said enlarged portion of the conduit with the other chamber and the latter chamber being closed except for its surge passage communication with said conduit, and said conduit being imperforate between its said open end and said surge passage.

4. Apparatus for dampening pulsations in a gas stream comprising an outer shell and an inner shell containing a first chamber and spaced from the outer shell to form therebetween a second chamber, means forming inlet and outlet openings respectively communicating with said chambers, a substantially imperforate conduit extending directly from one of said openings and including a restricted pipe of greater length than the outer shell and having an open end terminating in one of said chambers, there being an open surge passage connecting the conduit with the other chamber and the latter chamber being closed except for said surge passage communication with the conduit, and said conduit being imperforate between its said open end and said surge passage.

5. Apparatus for dampening pulsations in a gas stream comprising an elongated outer shell and an elongated inner shell containing a first chamber and spaced from the outer shell to form therebetween a second chamber, means forming inlet and outlet openings respectively communicating with said chambers, a substantially imperforate conduit extending directly from one of said openings and including a restricted pipe of greater length than the outer shell extending longitudinally within both chambers and having an open end terminating in one of said chambers, there being an open surge passage connecting the conduit with the other chamber and the latter chamber being closed except for said surge passage communication with the conduit, and said conduit being imperforate between its said open end and said surge passage.

6. Apparatus for dampening pulsations in a gas stream comprising an outer shell and an inner shell containing a first chamber and spaced from the outer shell to form therebetween a second chamber, means forming inlet and outlet openings respectively communicating with said chambers, a substantially imperforate conduit extending directly from one of said openings and including a restricted pipe of greater length than the outer shell extending within the inner chamber and having an open end terminating in the outer chamber, there being an open surge passage connecting the conduit with the inner chamber and said inner chamber being closed except for its surge passage communication with said conduit, and said conduit being imperforate between its said open end and said surge passage.

7. Apparatus for dampening pulsations in a gas stream comprising an elongated outer shell and an elongated inner shell containing a first chamber and spaced from the outer shell to form therebetween a second chamber, a plurality of gas inlets in the outer shell discharging into said second chamber, an outlet through which gas is discharged from said first chamber, a substantially imperforate conduit contained within the outer shell and including an enlarged diameter portion extending directly from said outlet and a continuing reduced diameter pipe of greater length than the outer shell extending within said first chamber and having an open end terminating in said second chamber, there being an open surge passage connecting said enlarged diameter portion of the conduit with said first chamber and said first chamber being closed except for said surge passage communication with the conduit, and said conduit being imperforate between its said open end and said surge passage.

FOSTER M. STEPHENS.

REFERENCES CITED

The following references are of record in the file of this patent:

UNITED STATES PATENTS

| Number | Name | Date |
|---|---|---|
| 2,070,543 | Cary | Feb. 9, 1937 |
| 2,182,945 | Gunn | Dec. 12, 1939 |
| 2,490,493 | Wade | Dec. 6, 1949 |
| 2,501,751 | Aldridge | Mar. 28, 1950 |
| 2,501,767 | Fluor et al. | Mar. 28, 1950 |
| 2,518,832 | Stephens | Aug. 15, 1950 |

FOREIGN PATENTS

| Number | Country | Date |
|---|---|---|
| 280,684 | Italy | Dec. 17, 1930 |